United States Patent
Sitbon et al.

(10) Patent No.: US 9,471,769 B2
(45) Date of Patent: Oct. 18, 2016

(54) METHOD AND DEVICE FOR CONTROLLING ACCESS TO A COMPUTER SYSTEM

(75) Inventors: Pascal Sitbon, Chatillon (FR); Arnaud Tarrago, Paris (FR); Pierre Nguyen, Montrouge (FR)

(73) Assignee: Electricite de France, Paris (FR)

( * ) Notice: Subject to any disclaimer, the term of this patent is extended or adjusted under 35 U.S.C. 154(b) by 72 days.

(21) Appl. No.: 13/997,780

(22) PCT Filed: Dec. 26, 2011

(86) PCT No.: PCT/FR2011/053197
§ 371 (c)(1),
(2), (4) Date: Jun. 25, 2013

(87) PCT Pub. No.: WO2012/089983
PCT Pub. Date: Jul. 5, 2012

(65) Prior Publication Data
US 2013/0283371 A1    Oct. 24, 2013

(30) Foreign Application Priority Data
Dec. 27, 2010    (FR) ..................................... 10 61285

(51) Int. Cl.
*G06F 21/00*    (2013.01)
*G06F 21/44*    (2013.01)
*G06F 21/83*    (2013.01)

(52) U.S. Cl.
CPC .............. *G06F 21/44* (2013.01); *G06F 21/83* (2013.01)

(58) Field of Classification Search
CPC ........ G06F 12/14; G06F 12/00; G06F 13/00; G11C 7/00; H03K 19/173
USPC ......................................................... 726/1, 17
See application file for complete search history.

(56) References Cited

U.S. PATENT DOCUMENTS

| 6,370,603 B1 * | 4/2002 | Silverman | G06F 13/385 709/220 |
| 6,618,774 B1 * | 9/2003 | Dickens | G06F 13/385 174/19 |

(Continued)

FOREIGN PATENT DOCUMENTS

| AU | 10 2005 008 966 A1 | 8/2006 |
| CN | 1452039 A | 10/2003 |

(Continued)

OTHER PUBLICATIONS

McDowell & Seyer, USB Explained, Sep. 1998, Prentice Hall, Chapter 6—On the Wire.*

(Continued)

*Primary Examiner* — Syed Zaidi
(74) *Attorney, Agent, or Firm* — Drinker Biddle & Reath LLP (57) ABSTRACT

A device for controlling access to a computer system, the device comprising at least one multifunctional port capable of being connected to various categories of peripherals and an access interface capable of being connected to the computer system, wherein the device comprises access management means connected between the multifunctional port and the interface, the access management means being physically configured to authorize the interface access by means of a peripheral connected to the multifunctional port, only if said peripheral belongs to a category of peripherals specifically and permanently associated with the multifunctional port to which same is connected.

14 Claims, 5 Drawing Sheets

(56) References Cited

U.S. PATENT DOCUMENTS

| | | | |
|---|---|---|---|
| 7,464,256 B2 | 12/2008 | Muir | |
| 2003/0056051 A1* | 3/2003 | Burke et al. | 710/302 |
| 2003/0200445 A1 | 10/2003 | Park | |
| 2004/0141083 A1 | 7/2004 | Takashima | |
| 2005/0015611 A1 | 1/2005 | Poisner | |
| 2006/0037084 A1* | 2/2006 | Brown et al. | 726/28 |
| 2006/0152249 A1* | 7/2006 | Madurawe | 326/80 |
| 2007/0050538 A1* | 3/2007 | Northcutt et al. | 711/112 |
| 2008/0022360 A1* | 1/2008 | Bacastow | G06F 21/85 726/1 |
| 2008/0028146 A1* | 1/2008 | Dan et al. | 711/115 |
| 2008/0163360 A1* | 7/2008 | Nishida | 726/17 |
| 2011/0047306 A1* | 2/2011 | Dickens et al. | 710/73 |
| 2012/0090022 A1* | 4/2012 | Walkes | 726/19 |

FOREIGN PATENT DOCUMENTS

| | | |
|---|---|---|
| CN | 1499830 A | 5/2004 |
| CN | 1816786 A | 8/2006 |
| JP | 2007-316946 A | 12/2007 |
| JP | 2008-165371 A | 7/2008 |
| JP | 2010-182335 A | 8/2010 |
| KR | 10-2007-0017609 A | 2/2007 |

OTHER PUBLICATIONS

English Translation of Office Action issued for RU 2013135240 (Sep. 19, 2014).

English Translation of Office Action issued for JP 2013-546758 (May 19, 2014).

Office Action issued for AU 2011350978 (Feb. 9, 2015).

English Translation of Office Action issued for related application CN 201180067964.2, Aug. 14, 2015, 9 pages.

* cited by examiner

METHOD AND DEVICE FOR CONTROLLING ACCESS TO A COMPUTER SYSTEM

CROSS-REFERENCE TO RELATED APPLICATIONS

This application is the U.S. national phase of the International Patent Application No. PCT/FR2011/053197 filed Dec. 26, 2011, which claims the benefit of French Application No. 1061285 filed Dec. 27, 2010, the entire content of which is incorporated herein by reference.

FIELD

The invention relates to the field of secured access to computer systems, and in particular that of controlling access to these computer systems by means of specific peripherals.

BACKGROUND

Existing computer systems have a certain number of ports allowing the connection of different types of peripherals serving both the user interface, the connection to other computer systems and also data storage.

The integrity of these computer systems can thus be breached by physically connecting to the ports of these systems, even without the knowledge of the user, certain peripherals that contain malicious data.

This can be the case in particular with USB (Universal Serial Bus) peripherals. USB ports are universal ports of the "multifunctional" type, meaning that they can accept a whole range of peripherals of different types, such as for example network interfaces, storage elements of the USB key type, keyboards, mice, webcams, etc.

The universal character of these ports, which is advantageous from the point of view of flexibility in terms of connection and supported functions offered by such interface, proves problematic in an environment where security is paramount, because it allows peripherals containing malicious data to be connected to the USB ports of critical computer systems to which access must be protected.

A malicious (alternatively negligent) user using such a peripheral containing for example undesirable data can thus take (alternatively lose) control, install viruses or record confidential data from a critical computer system thanks to the mere presence of USB ports on this system, to which he can connect such a type of peripheral.

It is impossible to purely and simply prohibit the use of these universal ports inasmuch as they are necessary for the use of certain essential peripherals, such as for example mice or keyboards.

In order to address this problem, software solutions have been proposed in which certain types of peripherals have access to certain functions, access to the functions being managed purely through the software. Thus, application US 2006/0037084 discloses a system for controlling access to different USB ports for a certain number of functionalities, selected and configurable dynamically by means of an operating system using stored configuration information.

However, these software solutions have the disadvantage that they are complex to manage and can be circumvented through vulnerabilities associated with the operating system used and the manner in which it manages these peripherals, or the manner in which the computer system is administered. The user of a peripheral containing malicious data, by taking control of such an operating system, can then reconfigure the functions to which the USB ports have access and gain access to the computer system with said peripheral, or even distribute the malicious content over the computer system or via the administrator rights of the system.

A purpose of the present invention is to overcome the aforesaid drawbacks.

SUMMARY

A purpose of the invention is to propose controlling access to computer systems via universal ports, which cannot be circumvented by a malicious or negligent user, and which is simple to manage.

To this end, the invention proposes a device for controlling access to a computer system, the device comprising at least one multifunctional port capable of being connected to different categories of peripherals and an access interface capable of being connected to the computer system, the device being characterized in that it comprises access management means connected between the multifunctional port and the interface, the access management means being physically configured to authorize access to the interface by means of a peripheral connected to the multifunctional port only if said peripheral belongs to a category of peripherals specifically and permanently associated with the multifunctional port to which it is connected.

According to an embodiment where said device comprises a first and a second multifunctional port, the access management means are physically configured to authorize access to the interface by means of a peripheral connected to the first multifunctional port only if said peripheral belongs to a first category of peripherals specifically and permanently associated with the first multifunctional port and to authorize access to the interface by means of a peripheral connected to the second multifunctional port only if said peripheral belongs to a second category of peripherals specifically and permanently associated with the second multifunctional port and different from the first category of peripherals.

According to an embodiment comprising moreover a third multifunctional port, the access management means are physically configured to authorize access to the interface by means of a peripheral connected to the third multifunctional port only if said peripheral belongs to a third category of peripherals specifically and permanently associated with the third multifunctional port and different from the first and second categories of peripherals.

In a particular embodiment, the access management means comprise a first access module, a second access module and a third access module connected respectively to the first multifunctional port, the second multifunctional port and the third multifunctional port, and the access interface comprises a hub module connected to said first, second and third access modules.

Advantageously, the access management means comprise an identification module configured to identify the category of said peripheral and to connect the interface to the multifunctional port to which the peripheral is connected only if the identified category of the peripheral corresponds to the category of peripherals specifically and permanently associated with said multifunctional port.

According to an embodiment, the access management means comprise storage means for storing the category of peripherals specifically and permanently associated with said multifunctional port. For example, the storage means can be of the read-only memory type. In this way, the association between a multifunctional port and a category of peripherals (stored in the read-only memory) for which access is authorized is advantageously permanent.

In an embodiment, the access management means are one-time programmable circuits such as for example circuits of the FPGA ("Field-Programmable Gate Array") type, said programmable circuits being configured so that they can no longer be modified after they have been programmed. Thus, advantageously, the programmable circuits cannot be modified by third parties or other malicious programs.

In an advantageous embodiment, the access management means comprise moreover a verification module, connected between the access management means and the interface, configured to carry out verification on the data transmitted between the multifunctional port and the interface.

In particular, the first, second and/or third category of peripherals corresponds to a category of peripherals selected from keyboards, mice and storage keys.

In a particular embodiment, the multifunctional port is a universal port of the USB type.

The invention proposes moreover a method for controlling access of a peripheral to a computer system via an access control device comprising a multifunctional port to which the peripheral is connected and an interface to which the computer system is connected, the method comprising the authorization of access, for the peripheral, to the interface connected to the computer system only if said peripheral belongs to a category of peripherals specifically and permanently associated with the multifunctional port to which said peripheral is connected.

Advantageously, this method comprises a step of identification of the category of said peripheral by the device, access to the interface being authorized only if the identified category of the peripheral corresponds to the category of peripherals specifically associated with the multifunctional port to which the peripheral is connected.

Advantageously, this method comprises a step of verification of the transmitted data, after the access authorization, between the multifunctional port to which the peripheral is connected and the interface of the device connected to the computer system.

According to an advantageous embodiment, the method comprises a prior step of permanent physical association of a specific category of peripherals respectively with each of said at least one multifunctional port of the device, these specific categories of peripherals being different from each other.

The present invention also proposes a computer program comprising code instructions for implementing the aforementioned access control method, when this program is executed by the processor of an access control device connecting a peripheral to a computer system. Such a program must be regarded as one produced within the scope of protection sought by the present patent application.

BRIEF DESCRIPTION OF THE DRAWINGS

Further features and advantages of the invention will become apparent on examination of the detailed description hereinafter, and the attached drawings in which.

DETAILED DESCRIPTION

Figure 1:
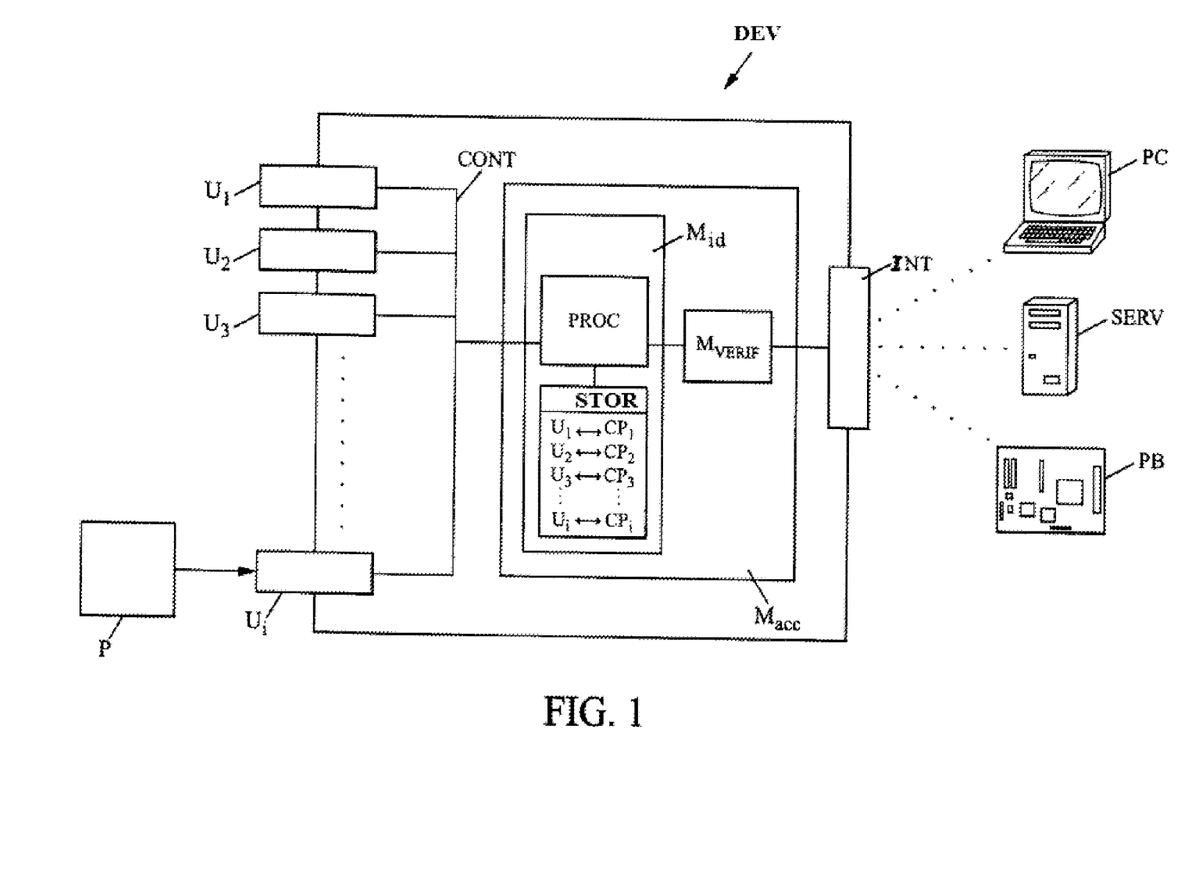
FIG. 1 is a block diagram illustrating an access control device according to the present invention.

Reference is made firstly to FIG. 1 in which an access control device according to the present invention is illustrated.

Said access control device DEV comprises a certain number of multifunctional ports $U_1$, $U_2$, $U_3$, . . . , $U_i$, allowing the connection of a peripheral P.

A single multifunctional port $U_1$ can be used in the device DEV, but the invention is more particularly advantageous when a plurality of multifunctional ports is used, as explained hereinafter.

By the term "multifunctional port" is meant herein any universal port allowing the connection of peripherals belonging to different categories of peripherals, as opposed to a "single-function port" dedicated to a single type of peripheral as is the case for example with PS/2 ports (use restricted to the connection of user peripherals of the mouse or keyboard type), IEEE 1394 ports or Ethernet ports (use restricted to the connection of network equipment), VGA ports (use restricted to the connection of screens), etc.

By way of example, USB ports can be mentioned here as multifunctional ports, inasmuch as such USB ports can allow the connection of peripherals belonging to categories as diverse as mice, keyboards, storage units, modems, network interfaces, webcams, etc.

The access control device DEV also comprises an access interface INT allowing the connection of the device DEV to a computer system.

By the term "computer system" is meant herein any system or device capable of computerized data processing, whether a personal computer PC, a server SERV, or a motherboard PB, as illustrated.

In the first two cases, the device DEV can take the form of an external box capable of being connected between the peripheral P and the computer PC or the server SERV, by means of a conventional interface. In the last case, the interface INT can be of the PCI type and the device DEV can take the form of an internal card capable of being connected to a motherboard PB situated inside a computer case.

The device DEV comprises moreover access management means $M_{acc}$, connected between the multifunctional ports $U_1, U_2, U_3, \ldots, U_i$, by means of a controller CONT, and the access interface INT. These access management means $M_{acc}$ are physically configured to authorize access to the access interface INT by means of the peripheral P, when said peripheral P is connected to the multifunctional port $U_i$, only if said peripheral P belongs to a category of peripherals specifically and permanently associated with the multifunctional port.

To this end, the access management means $M_{acc}$ respectively associate each of the multifunctional ports $U_1$, $U_2$, $U_3$, . . . , $U_i$ with a single category of peripherals $CP_i$. Said association, specific to each multifunctional port, is carried out permanently and non-modifiably, in a physical manner, during the physical design of the access management means, in order to prevent a malicious user modifying this specific association.

Thus, each multifunctional port $U_1$, $U_2$, $U_3$, . . . , $U_i$ is associated with a single category of peripherals $CP_i$. Such a category of peripherals $CP_i$ can be selected from the following different categories, the list below being non-limitative:

computer keyboards;
computer mice;
USB storage peripherals;
printers;
chip card reader;
audio peripherals;
image peripherals;
video peripherals;

Such a permanent association of a specific category of peripherals with each multifunctional port $U_1, U_2, U_3, \ldots, U_i$, can be carried out by producing the access management means $M_{acc}$ in the form of a programmable circuit, for example of the FPGA type, which can no longer be modified after programming said circuit and which avoids the need to use software for controlling access to the interface INT. Thus, whatever the level of security of the computer system to which the device DEV acts as intermediary for the connection of a peripheral P, the device DEV provides a level of independent preventive security.

The access management means $M_{acc}$ can be presented in the form of a single module managing the access of all the multifunctional ports to the interface INT, or in the form of several modules dedicated to managing the specific access of some of the multifunctional ports to the interface INT, for example a module dedicated to managing the access of storage peripherals to the interface INT and a module dedicated to managing the access of peripherals of the mouse or keyboard type to the interface INT.

Thus, in an embodiment where the device DEV comprises a first multifunctional port $U_1$ and a second multifunctional port $U_2$, its access management means $M_{acc}$ are physically configured to authorize access to the interface INT by means of the peripheral P, when it is connected to the first multifunctional port $U_1$, only if said peripheral P belongs to a first category $CP_1$ of peripherals specifically and permanently associated with the first multifunctional port $U_1$.

In this embodiment, the access management means $M_{acc}$ of the device DEV are configured moreover to authorize access to the interface INT by means of the peripheral P, when it is connected to the second multifunctional port $U_2$, only if said peripheral P belongs to a second category of peripherals $CP_2$ specifically and permanently associated with the second multifunctional port $U_2$ and different from the first category of peripherals $CP_1$.

In another embodiment where, apart from the first and second multifunctional ports $U_1$ and $U_2$, associated respectively with the categories $CP_1$ and $CP_2$ of peripherals, the device DEV comprises a third multifunctional port $U_3$, the access management means $M_{acc}$ are physically configured to authorize access to the interface INT by means of the peripheral P, when it is connected to the third multifunctional port $U_3$, only if the peripheral P belongs to a third category $CP_3$ of peripherals specifically and permanently associated with the third multifunctional port $U_3$ and different from the first and second categories of peripherals $CP_1$ and $CP_2$.

In an advantageous embodiment, the access management means $M_{acc}$ comprise an identification module $M_{id}$.

Said identification module $M_{id}$ is configured, on the one hand, to identify the category CP of peripherals to which the peripheral P belongs when it connects to the multifunctional port $U_i$.

Thus, in the illustrative case of multifunctional ports of the USB type, an item of data identifying the category of peripheral is transmitted over a USB controller, in the form of two hexadecimal numbers, when the peripheral connects to a USB port.

Such an item of identification data is in particular defined in the "bDeviceClass", field, in other words in the form of a class code predefined in the USB standard, present in the "device descriptors" also defined according to the USB standard.

However, as the identification of a peripheral is not always systematically carried out with a static field, it is also possible to observe several exchanges between the peripheral P and the host computer system PC or SERV, before determining the category CP of the peripheral P. As the device DEV is situated physically between the peripheral P and the host computer system, said device has complete freedom to determine exactly the category CP of the peripheral P. According to the category and the exchanges observed, the device can decide to allow the exchanges to take place without modifying them, filtering and/or altering them (for example restricting commands, data on the size, content, etc.) or to make the peripheral inoperable. In the latter case, the peripheral will be deemed disconnected by the host computer system.

By way of example, the following "bDeviceClass" fields, used in the USB standard, are given purely for illustration purposes in Table 1 below:

TABLE 1 list of the categories of peripherals associated with "bDeviceClass" class codes predefined in the USB standard

| "bDeviceClass" field value | Type of peripheral denoted by the class code |
|---|---|
| 00 | Each interface specifies its own class code |
| 01 | Audio peripheral |
| 02 | Control and communications peripheral |
| 03 | Human-interface device (HID) |
| 05 | Physical peripheral |
| 06 | Image peripheral |
| 07 | Printer peripheral |
| 08 | Mass storage peripheral |
| 09 | Hub |
| 0E | Video peripheral |
| E0 | Wireless controller |
| FF | Class code specified by the vendor |

Thus, in the event that the multifunctional ports are universal ports of the USB type and where the controller CONT is a USB controller, the identification module $M_{id}$ can identify the category CP of a peripheral P connected to the multifunctional port $U_i$ by intercepting the so-called "device descriptor" data exchanged over the USB controller when said peripheral P is connected.

The identification module $M_{id}$ can then, by means of the extraction of these "device descriptor" data (class code of the peripheral P given in the "bDeviceClass" field and other fields such as subClass and interfaceClass, etc.) and by means of observing the exchanges between the peripheral P and the interface INT, deduce from said class code the category CP of said peripheral P.

Said identification module $M_{id}$ is moreover configured to connect the interface INT to the multifunctional port $U_i$ only if the identified category CP of the peripheral corresponds to the category of peripherals $CP_i$ specifically and permanently associated with said multifunctional port $U_i$.

Data transfer between the peripheral P and a computer system connected to the interface INT cannot then take place unless the peripheral P is actually of the type specifically intended to be connected to the multifunctional port $U_i$.

It can also be envisaged to modify the type of peripheral on the fly, in order to hide its true nature from the host computer system.

For example, when the user connects a "multi-function" keyboard with programmable keys to the device DEV, it is possible for the device DEV only to inform the computer system of a normal 105-key keyboard, which makes use of the computer system's default driver. In this event, only the conventional keys of the "multi-function" keyboard will be seen by the computer system.

In addition to this type restriction, the device DEV can then validate, modify or delete certain actions on the fly, during the exchanges between the peripheral and host computer system. For example, it is possible to (physically) prevent any request to write to a storage peripheral.

In order to implement these two functionalities of identification and connection, the identification module $M_{id}$ can be implemented physically in the form of a processor PROC connected, on the one hand, to the controller CONT in order to receive data transmitted during the connection of the peripheral P to the multifunctional port $U_i$ and, on the other hand, to storage means STOR of read-only memory type in which are stored permanently, for each multifunctional port $U_1, \ldots, U_i$ of the device DEV, the category of peripherals $CP_1, \ldots, CP_i$ specifically associated respectively with the multifunctional port $U_1, \ldots, U_i$.

The processor PROC of the identification module $M_{id}$ then uses the data received from the controller CONT to find within the storage means STOR the category of peripherals $CP_i$ specifically associated with the multifunctional port $U_i$, verifies that the identified category CP of the peripheral P actually corresponds to the category $CP_i$, and allows the connection (i.e. data transfer between the peripheral P and the interface INT) if the result of said verification is positive.

In an advantageous embodiment, the access management means $M_{acc}$ comprise moreover a verification module $M_{VERIF}$, connected between the access management means $M_{acc}$ and the interface INT, and configured to carry out verification on the data transmitted between the multifunctional port $U_i$ and the interface INT, therefore between the peripheral P when it is connected to the multifunctional port $U_i$ and a computer system connected to the interface INT.

Such verification can be done for example by restricting or modifying on the fly the exchanges between the multifunctional port $U_i$ and the interface INT, whether at the level of the low-level commands (of the type: reading a memory address, pressing a key, acquiring a value or data item, etc.) or by verifying that the data conveyed comply with certain requirements, for example that the characters transmitted actually belong to a given alphabet, by verifying that the data lines actually correspond to certain predefined characteristics, by verifying a signature provided with the transmitted data, etc.

This verification can apply to all data packets exchanged between the multifunctional port $U_i$ and the interface INT, in a more or less developed manner, by means of a whitelist, a stateful filter, a memory filter (according to the previous exchanges) or a packet size verification, or a digital signature for example.

In the event of failure of said verification, in an embodiment, data are no longer transmitted between the peripheral P and the information system and access to the information system is interrupted, making it possible to provide an additional level of access control. In another embodiment, these data are modified on the fly so as to be made harmless.

Figure 2A:
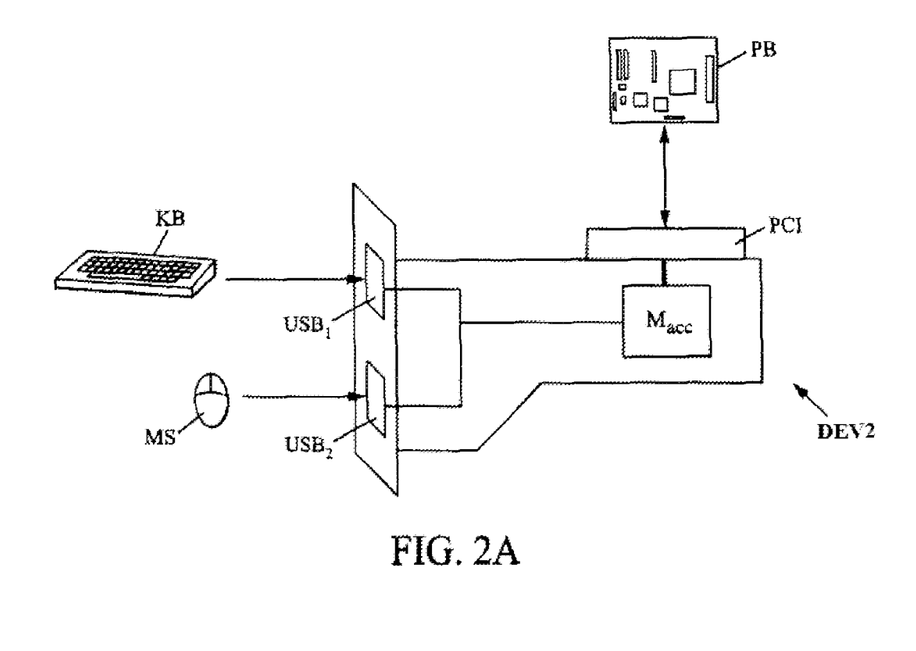
FIGS. 2A to 2C illustrate three particular embodiments of the access control device in FIG. 1.

Reference is now made to FIG. 2A which illustrates a first particular embodiment of the access control device in FIG. 1, comprising only two multifunctional ports.

In said first particular embodiment, the access control device DEV2 illustrated takes the form of a PCI card to be installed in a case of a personal computer, with a PCI interface serving as the connection to the motherboard PB of the personal computer.

This device DEV2 comprises a first multifunctional port $USB_1$, of the USB type, and a second multifunctional port $USB_2$, of the USB type.

The access management means $M_{acc}$ of the device DEV2 are then physically configured, as mentioned above, to authorize access to the PCI interface by means of a peripheral KB, when it is connected to the first multifunctional port $USB_1$, only if said peripheral KB belongs to a first category $CP_1$ of peripherals specifically and permanently associated with the first multifunctional port $USB_1$, here the category of computer keyboards.

The access management means $M_{acc}$ of the device DEV2 are also physically configured to authorize access to the PCI interface by means of a peripheral MS, when it is connected to the second multifunctional port $USB_2$, only if said peripheral MS belongs to a second category $CP_2$ of peripherals specifically and permanently associated with the second multifunctional port $USB_2$ and different from the first $CP_1$ category of peripherals, here the category of computer mice.

In this embodiment, the means of access $M_{acc}$ therefore consist of a single access management module common to the two multifunctional ports $USB_1$ and $USB_2$. Thus, when a personal computer has only one such device DEV2 for communicating with users, only keyboards of the USB type are accepted on the first port $USB_1$ and only mice of the USB type are accepted on the second port $USB_2$, which prevents for example the connection of USB keys for recovering sensitive data or network cables of the USB type to attempt to take control of the personal computer.

Figure 2B:
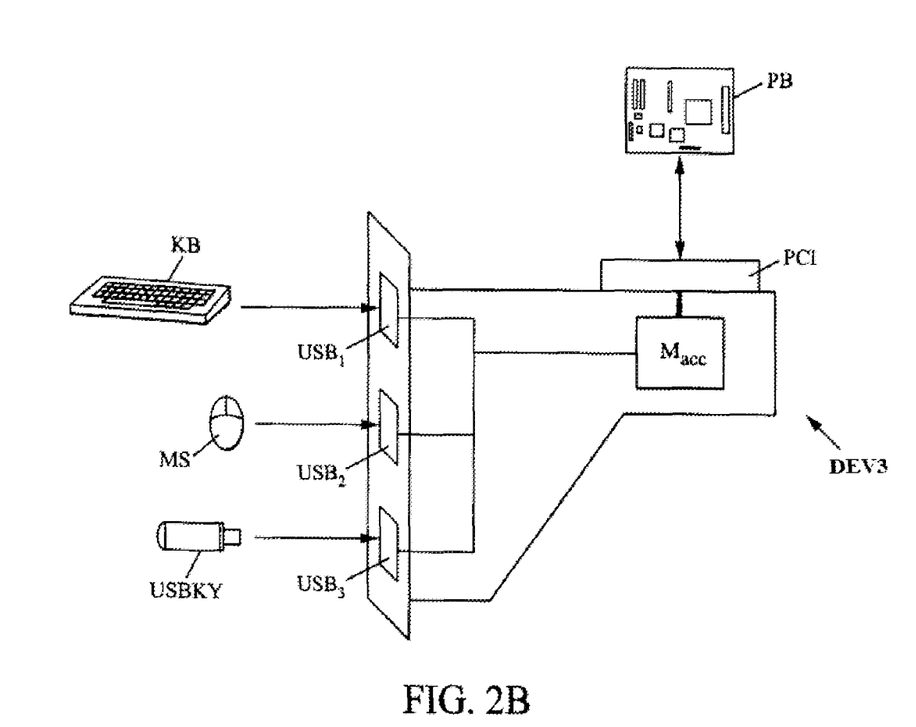

Reference is now made to FIG. 2B which illustrates a second particular embodiment of the access control device in FIG. 1 comprising only three multifunctional ports.

In said second particular embodiment, the access control device DEV3 illustrated still takes the form of a PCI card to be installed in a case of a personal computer, with a PCI interface serving as the connection to the motherboard PB of the personal computer.

Said device DEV3 comprises a first multifunctional port $USB_1$, a second multifunctional port $USB_2$ and a third multifunctional port $USB_3$, all of the USB type.

The access management means $M_{acc}$ of the device DEV3 are then physically configured, as mentioned above, to authorize access to the PCI interface by means of a peripheral KB, when it is connected to the first multifunctional port $USB_1$, only if said peripheral KB belongs to a first category $CP_1$ of peripherals specifically and permanently associated with the first multifunctional port $USB_1$, here the category of computer keyboards.

The access management means $M_{acc}$ of the device DEV3 are also physically configured to authorize access to the PCI interface by means of a peripheral MS, when it is connected to the second multifunctional port $USB_2$, only if said peripheral MS belongs to a second category $CP_2$ of peripherals specifically and permanently associated with the second multifunctional port $USB_2$ and different from the first $CP_1$ category of peripherals, here the category of computer mice.

The access management means $M_{acc}$ of the device DEV3 are finally physically configured to authorize access to the PCI interface by means of a peripheral USBKY, when it is connected to the third multifunctional port $USB_3$, only if said peripheral USBKY belongs to a third category $CP_3$ of peripherals specifically and permanently associated with the third multifunctional port $USB_3$ and different from the first and second categories of peripherals $CP_1$ and $CP_2$, here the category of USB storage keys.

In this embodiment, the means of access $M_{acc}$ therefore consist of a single access management module common to the three multifunctional ports $USB_1$, $USB_2$ and $USB_3$.

Thus, when a personal computer has only one such device DEV3 available for communicating with users, only keyboards of the USB type are accepted on the first port $USB_1$, only mice of the USB type are accepted on the second port $USB_2$, and only USB storage keys are accepted on the third port $USB_3$.

This prevents for example the connection of network cables of the USB type in an attempt to take control of the personal computer, while allowing data storage, an option which is not provided by the device DEV2 illustrated in FIG. 2A.

Inasmuch as connecting a USB storage key is possible with the device DEV3, a lower level of physical security is provided with said device, and it can then be advantageous to use a verification module similar to the module $M_{VERIF}$ described in relation to FIG. 1, in order to carry out a check on the data transmitted between the PCI interface and a key USBKY connected to the third port $USB_3$.

Figure 2C:
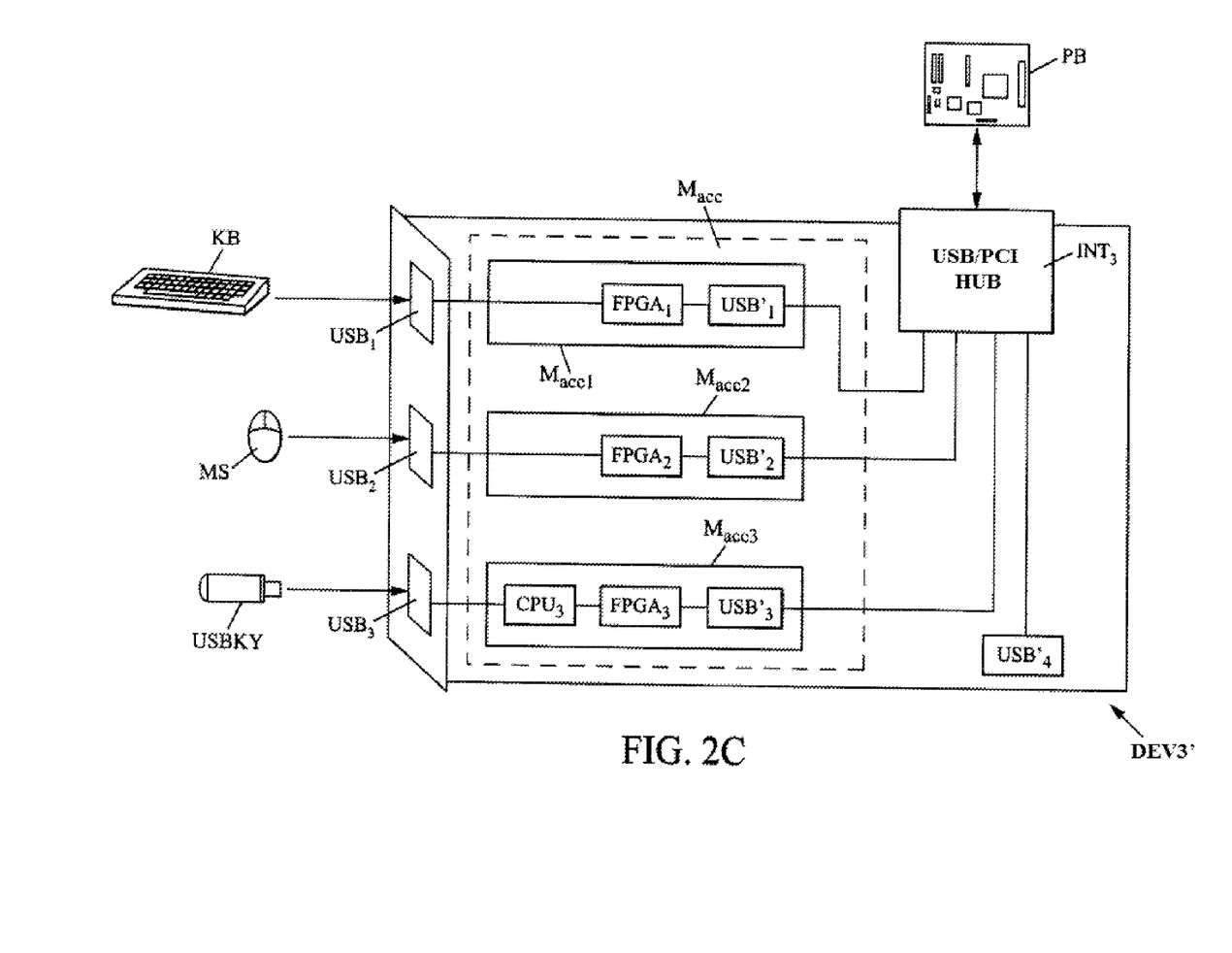

Reference is now made to FIG. 2C which illustrates a third particular embodiment of the access control device in FIG. 1, also comprising three multifunctional ports.

In this third particular embodiment relating to a device DEV3' comprising an interface $INT_3$, a first multifunctional port $USB_1$, of the USB type, dedicated to connecting a peripheral KB of the keyboard type, a second multifunctional port $USB_2$, of the USB type, dedicated to connecting a peripheral MS of the mouse type and a third multifunctional port $USB_3$, of the USB type, dedicated to connecting a peripheral USBKY of the storage key type, the access management means $M_{acc}$ comprise a first access management module $M_{acc1}$, a second access management module $M_{acc2}$ and a third access management module $M_{acc3}$ associated respectively with the multifunctional ports $USB_1$, $USB_2$ and $USB_3$ and dedicated respectively to the aforementioned types of peripherals.

In particular, the first access management module $M_{acc1}$ comprises a processing module $FPGA_1$, connected to the multifunctional port $USB_1$ and configured to carry out the aforementioned access management as well as the verification on the data coming from a peripheral KB and passing through said port $USB_1$, as well as an internal USB port, denoted $USB'_1$ and connected to the processing module $FPGA_1$. The data coming from the peripheral KB and verified in said first access management module $M_{acc1}$ are thus available at the output of said module on the internal USB port $USB'_1$.

This processing module $FPGA_1$ is thus configured physically, as mentioned above, to authorize access to the interface $INT_3$ by means of a peripheral KB, when it is connected to the first multifunctional port $USB_1$, only if said peripheral KB belongs to a first category $CP_1$ of peripherals specifically and permanently associated with the first multifunctional port $USB_1$, here the category of computer keyboards.

Similarly, the second access management module $M_{acc2}$ comprises a processing module and configured to carry out the aforementioned verification on the data coming from a peripheral MS and passing through said port $USB_2$, as well as an internal USB port, denoted $USB'_2$ and connected to the processing module $FPGA_2$. The data coming from the peripheral MS and verified in this second access management module $M_{acc2}$ are thus available at the output of said module on the internal USB port $USB'_2$.

This processing module $FPGA_2$ is thus configured physically, as mentioned above, to authorize access to the interface $INT_3$ by means of a peripheral MS, when it is connected to the second multifunctional port $USB_2$, only if said peripheral MS belongs to a second category $CP_2$ of peripherals specifically and permanently associated with the second multifunctional port $USB_2$, here the category of mice.

Finally, the third access management module $M_{acc3}$ comprises a first processing module $CPU_3$ connected to the multifunctional port $USB_3$, a second processing module $FPGA_3$ connected to the first processing module $CPU_3$, as well as an internal USB port, denoted $USB'_3$ and connected to the second processing module $FPGA_3$.

The second processing module $FPGA_3$ is configured physically, as mentioned above, to authorize access to the interface $INT_3$ by means of a peripheral USBKY, when it is connected to the third multifunctional port $USB_3$, only if said peripheral USBKY belongs to a third category $CP_3$ of peripherals specifically and permanently associated with the third multifunctional port $USB_3$, here the category of storage peripherals such as for example USB storage keys. The second processing module $FPGA_3$ is thus configured to carry out the function of identifying the category of the peripheral connected to the multifunctional port $USB_3$ and thus acts as an identification module $M_{id}$ within the meaning previously described.

As for the first processing module $CPU_3$, it is configured to carry out the verification of data exchanged via the port $USB_3$ in the aforementioned manner. Said first processing module $CPU_3$ therefore acts as a verification module $M_{VERIF}$ within the meaning previously described.

Thus, when a personal computer has only one such device DEV3' available for communicating with users, only keyboards of the USB type are accepted on the first port $USB_1$, only mice of the USB type are accepted on the second port $USB_2$, and only USB storage keys are accepted on the third port $USB_3$.

Here, unlike the second embodiment, the device DEV3' comprises an interface $INT_3$ itself comprising a USB hub module, connected to the internal ports $USB_1$, $USB_2$ and $USB_3$ in order to manage the data exchanges between these different interfaces. The interface $INT_3$ also comprises a PCI interface to allow the device DEV3' to be connected to a motherboard PB and to allow data exchanges between the motherboard and the multifunctional ports.

The use of an interface $INT_3$ with a USB hub module makes it possible to optimize the internal data exchanges between the different access management modules and the computer system to which the device DEV3' is connected.

The USB hub of the interface $INT_3$ can be connected moreover to another internal USB interface $USB'_4$, allowing the unfiltered exchange of data with the computer system in which the device DEV3' is installed.

In the device DEV3', the verification is carried out only on the data exchanged with a storage peripheral connected to the port $USB_3$, and not on the data received from ports $USB_1$ and $USB_2$, which makes it possible to optimize the internal arrangement of the device and to avoid needless verifications.

Figure 3:
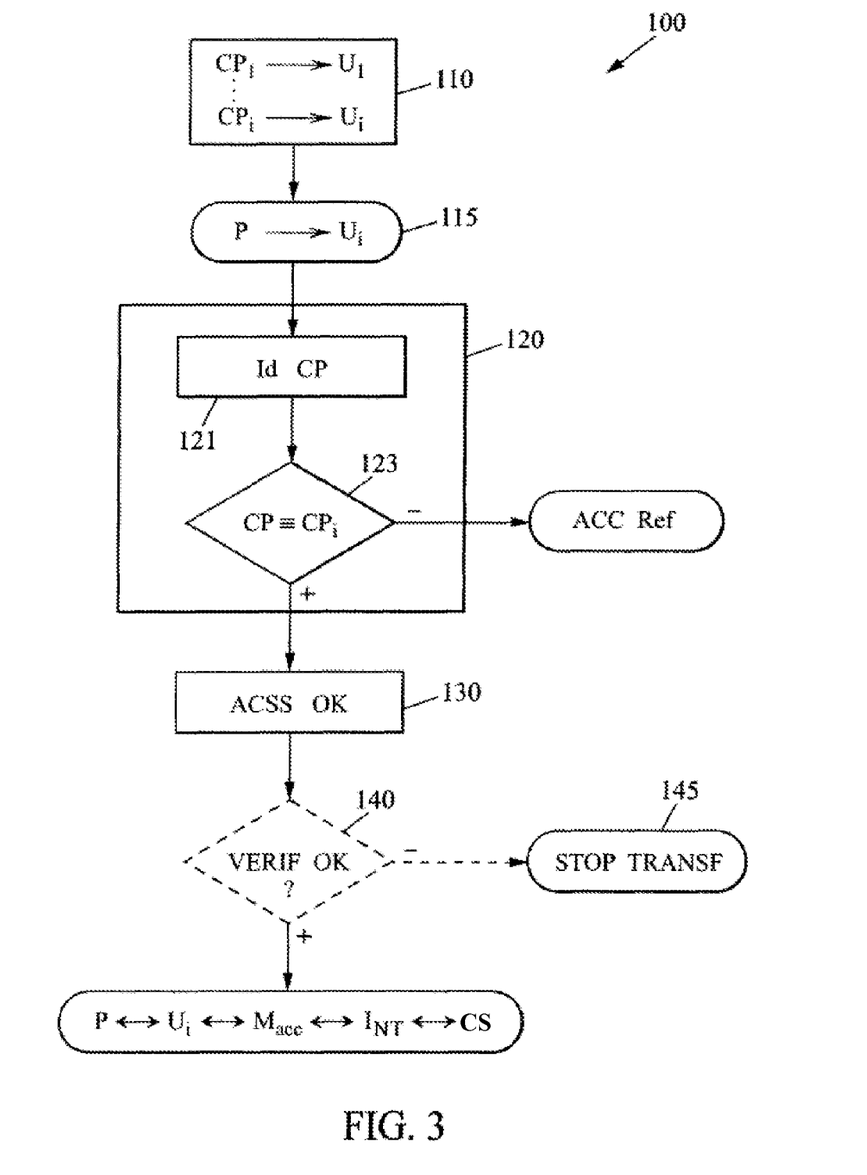
FIG. 3 illustrates the steps of a method for controlled access to a computer system according to the present invention.

Finally reference is made to FIG. 3 which illustrates the steps of a method of controlled access to a computer system according to the present invention.

Such a controlled access method 100 uses an access control device DEV, as described in relation to FIG. 1, comprising a certain number of multifunctional ports $U_1, \ldots, U_i$ serving as the connection to different peripherals, an access interface INT serving as the connection to the computer system in question and access management means $M_{acc}$, connected between the multifunctional ports $U_1, \ldots, U_i$ and the access interface INT, managing the connection between the multifunctional ports $U_1, \ldots, U_i$ and the access interface INT.

The access control method 100 can start with a prior step 110 of permanent physical association of a specific category of peripherals $CP_1, \ldots, CP_i$ respectively with each of said at least one multifunctional port $U_1, \ldots, U_i$ of the device DEV, these different specific categories of peripherals $CP_1, \ldots, CP_i$ being different from each other.

As mentioned above, said permanent physical association can be carried out by programming the access management means $M_{acc}$ in the form of a programmable circuit of the FPGA type, which can no longer be modified after said circuit has been programmed.

This makes it possible to physically set the different specific categories of peripherals $CP_1, \ldots, CP_i$ associated respectively with the multifunctional ports $U_1, \ldots, U_i$ and therefore to prevent a malicious user from modifying such an association, which can occur with a non-physical implementation of the software type.

Following the connection of a peripheral P to one of the multifunctional ports $U_i$ (connection step 115), the method 100 comprises the verification (step 120) of the fact that the peripheral P actually belongs to the category $CP_i$ of peripherals specifically and permanently associated with the multifunctional port $U_i$ to which said peripheral P is connected.

If such is indeed the case, and only in this case, access is authorized (authorization step 130) by the means of access $M_{acc}$, for said peripheral P, to the interface INT of the device DEV, and therefore to the computer system to which said interface INT is connected. The access authorization step 130 can then comprise data transfer between the peripheral P and the computer system CS in question, via the multifunctional port $U_i$, the access management means $M_{acc}$ and the access interface INT of the device DEV.

Otherwise, i.e. when the peripheral P does not belong to the category $CP_i$ of peripherals specifically and permanently associated with the multifunctional port $U_i$ to which the peripheral P is connected, the access of the peripheral P to the interface INT of the device DEV is refused and blocked by the means of access $M_{acc}$ of the device DEV.

In a particular embodiment, the method 100 after connection of the peripheral P to the multifunctional port $U_i$, the identification (step 121) of the category CP of the peripheral P by the device DEV (more particularly by an identification module $M_{id}$ comprised within its means of access $M_{acc}$), access to the access interface INT then being authorized as a function of comparison of the identified category CP and of the category $CP_i$ of peripherals specifically and permanently associated with the multifunctional port $U_i$ (comparison step 123).

If the identified category CP corresponds to the category $CP_i$ of peripherals specifically and permanently associated with the multifunctional port $U_i$, and only in this case, access of the peripheral P to the interface INT of the device DEV, and therefore to the computer system to which said interface INT is connected, is authorized by the means of access $M_{acc}$ (authorization step 130).

If, on the other hand, the identified category CP does not correspond to the category $CP_i$ of peripherals specifically and permanently associated with the multifunctional port $U_i$, access of the peripheral P to the interface INT of the device DEV is refused and blocked by the means of access $M_{acc}$ of the device DEV.

In an advantageous embodiment, the access control method 100 comprises moreover the verification (step 140) of the transmitted data, after the access authorization step 130, between the multifunctional port $U_i$ to which the peripheral is connected and the interface INT of the device DEV connected to the computer system CS.

The verification can be carried out by a verification module $M_{verif}$ as previously described and can comprise, for example, verification of the fact that the transmitted characters actually belong to a given alphabet, that the data lines actually correspond to certain predefined characteristics, or verification of a signature provided with the transmitted data, etc.

If the result of said verification is positive, the peripheral P can communicate and exchange data with a computer system connected to the interface INT via the multifunctional port $U_i$, the means of access $M_{acc}$ and the access interface INT of the device DEV.

If the result of said verification is negative, the data transfer between the peripheral P and the access interface INT of the device DEV is interrupted by the access management means $M_{acc}$ (data transfer interruption step 145).

The present invention relates moreover to a computer program comprising the code instructions for implementing the access control method previously described when said program is executed by the processor of an access control device, for example by the processor PROC situated in the identification module $M_{id}$ of the device DEV described in FIG. 1.

Such a program can use any programming language, and be in the form of a source code, object code, or intermediate code between source code and object code, such as in a partially-compiled form, or in any other desirable form.

The present invention also relates to an information storage medium that can be read by a computer or a data processor, and comprising the aforementioned program code instructions. This information storage medium can be any entity or device capable of storing the program. For example, the media can comprised a storage means, such as a ROM, for example a CD ROM or a microelectronic circuit ROM, or also a magnetic recording means, for example a floppy disc or a hard drive. This information storage medium can also comprise FLASH-type memory, for storing the program and recording information received by a client module, and RAM-type memory for saving temporary data such as server lists and associated matters.

Moreover, this information storage medium can be a transmissible medium such as an electrical or optical signal, which can be conveyed via an electrical or optical cable, by radio or by other means. The program according to the invention can in particular be downloaded over a network of the Internet type.

Of course, the invention is not limited to the above-described and represented embodiments, on the basis of which other modes and other embodiments can be envisaged, without thereby exceeding the scope of the invention.

The invention claimed is:

1. A device for controlling access to a computer system, the device comprising at least one multifunctional port capable of being connected to different categories of peripherals and an access interface capable of being connected to the computer system, wherein:

the device comprises access management means connected between the multifunctional port and the access interface, and the access management means comprise:

programmable circuits configured to be physically modified only during a physical design stage to be unalterable by third parties or malicious programs, and a read-only memory configured to be physically modified only during a physical design stage storing a category of peripherals specifically and permanently associated with said multifunctional port, so as to be physically configured to authorize access to the access interface by means of a peripheral connected to the multifunctional port, the programmable circuits being configured to connect the peripheral to the multifunctional port only if said peripheral belongs to the stored category of peripherals specifically and permanently associated in the read-only memory with the multifunctional port to which it is connected.

2. The device according to claim 1, wherein the device comprises a first and a second multifunctional port, and the access management means are physically configured to authorize access to the access interface by means of a peripheral connected to the first multifunctional port only if said peripheral belongs to a first category of peripherals specifically and permanently associated with the first multifunctional port and to authorize access to the access interface by means of a peripheral connected to the second multifunctional port only if said peripheral belongs to a second category of peripherals specifically and permanently associated with the second multifunctional port and different from the first category of peripherals.

3. The device according to claim 2, wherein the device further comprises a third multifunctional port and the access management means are physically configured to authorize access to the access interface by means of a peripheral connected to the third multifunctional port only if said peripheral belongs to a third category of peripherals specifically and permanently associated with the third multifunctional port and different from the first and second categories of peripherals.

4. The device according to claim 3, wherein the access management means comprise a first access module, a second access module and a third access module connected respectively to the first multifunctional port, the second multifunctional port and the third multifunctional port, and the access interface comprises a hub module connected to said first, second and third access modules.

5. The device according to claim 1, wherein the access management means comprise an identification module that comprises a processor that:
   identifies the category of said peripheral; and
   connects the access interface to the multifunctional port to which the peripheral is connected only if the identified category of the peripheral corresponds to the category of peripherals specifically and permanently associated with said multifunctional port.

6. The device according to claim 1, wherein the access management means further comprise a verification module, comprising:
   a connection to the access management means; and
   a connection to the access interface,
   the verification module carrying out verification on the data transmitted between the multifunctional port and the access interface.

7. The device according to claim 1, wherein the programmable circuits are one-time programmable circuits.

8. The device according to claim 1, wherein the first, second and/or third category of peripherals correspond to a category of peripherals selected from keyboards, mice and storage keys.

9. The device according to claim 1, wherein the at least one multifunctional port is a universal port of the USB type.

10. A method of controlling access of a peripheral to a computer system via an access control device comprising a multifunctional port to which the peripheral is connected and an interface to which the computer system is connected, and access management means connected between the multifunctional port and the access interface, and the access management means comprise:
    programmable circuits configured to be physically modified only during a physical design stage to be unalterable by third parties or malicious programs, and
    a read-only memory configured to be physically modified only during a physical design stage storing a category of peripherals specifically and permanently associated with said multifunctional port,
so as to be physically configured to authorize access to the access interface by means of a peripheral connected to the multifunctional port, the programmable circuits being configured to connect the peripheral to the multifunctional port only if said peripheral belongs to the stored category of peripherals specifically and permanently associated in the read-only memory with the multifunctional port to which it is connected, and
the method comprising:
    physical design of the access control device to:
    secure programmable circuits of the access control device against third parties' attacks or malicious programs, and
    only authorize access for peripherals belonging to a category of peripherals specifically and permanently associated with the multifunctional port to which it is connected, and
    authorization of access, for the peripheral, to the interface connected to the computer system only if said peripheral belongs to the category of peripherals specifically and permanently associated with the multifunctional port to which said peripheral is connected.

11. The method according to claim 10, wherein the identification of the category of said peripheral by the device, access to the interface being authorized only if the identified category of the peripheral corresponds to the category of peripherals specifically associated with the multifunctional port to which the peripheral is connected.

12. The method according to claim 10, wherein verification of the transmitted data, after the access authorization, between the multifunctional port to which the peripheral is connected and the interface of the device connected to the computer system.

13. The method according to claim 10, wherein a prior step of permanent physical association of a specific category of peripherals respectively with each of said at least one multifunctional port of the device, said specific categories of peripherals being different from each other.

14. A non-transitory computer program product comprising code instructions for implementing
    a method of controlling access of a peripheral to a computer system via an access control device comprising a multifunctional port to which the peripheral is connected and an interface to which the computer system is connected, and access management means connected between the multifunctional port and the access interface, and the access management means comprise:
  programmable circuits configured to be physically modified only during a physical design stage to be unalterable by third parties or malicious programs, and
  a read-only memory configured to be physically modified only during a physical design stage storing a category of peripherals specifically and permanently associated with said multifunctional port,
so as to be physically configured to authorize access to the access interface by means of a peripheral connected to the multifunctional port, the programmable circuits being configured to connect the peripheral to the multifunctional port only if said peripheral belongs to the stored category of peripherals specifically and permanently associated in the read-only memory with the multifunctional port to which it is connected, and the method comprising:
  physical design of the access control device to:
    secure programmable circuits of the access control device against third parties' attacks or malicious programs,
    only authorize access for peripherals belonging to a category of peripherals specifically and permanently associated with the multifunctional port to which it is connected, and
    authorization of access, for the peripheral, to the interface connected to the computer system only if said peripheral belongs to the category of peripherals specifically and permanently associated with the multifunctional port to which said peripheral is connected;
  when this program is executed by a processor of an access control device connecting a peripheral to a computer system.

* * * * *